Figure 1:
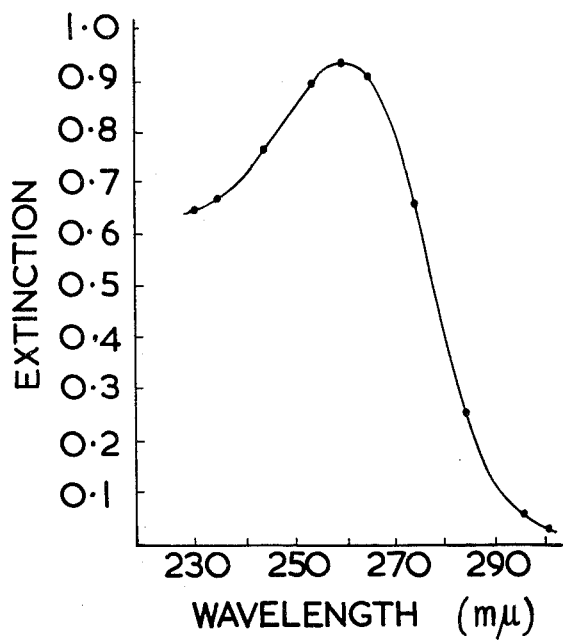

FIG. I.

3,202,656
DERIVATIVES OF CEPHALOSPORIN C
Edward Penley Abraham and Guy Geoffrey Frederick Newton, Oxford, and Jonathan d'Ardern Jeffery, Liverpool, England, assignors to National Research Development Corporation, London, England, a British corporation
Filed Apr. 4, 1961, Ser. No. 100,731
Claims priority, application Great Britain, Apr. 11, 1960, 12,866/60
8 Claims. (Cl. 260—243)

This invention relates to derivatives of Cephalosporin C and related compounds, and to methods for the preparation thereof.

The structure

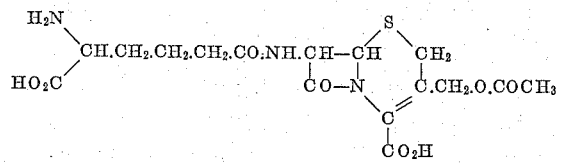

has been proposed for Cephalosporin C, and the present invention provides a method of removing the acetyl group therefrom so as to yield the corresponding alcohol derivative.

In co-pending applications Nos. 45,364, filed July 26, 1960, and 191,213, filed April 30, 1962, a method of removing the amino-adipyl sidechain from Cephalosporin C is described, the resulting product having the structure

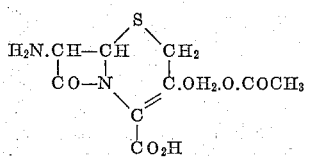

and being referred to as 7-aminocephalosporanic acid. Moreover, N-acyl derivatives of 7-aminocephalosporanic acid are described in the said co-pending application No. 191,213. The present invention provides also a method of removing the acetyl group from 7-aminocephalosporanic acid and N-acyl derivatives thereof.

According to the invention, therefore, there are provided desacetyl compounds of structure

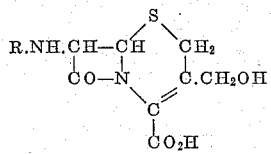

in which R represents a hydrogen atom or an N-acyl group, and salts thereof, e.g., the sodium, potassium and ammonium salts thereof, and the acid addition salts where R represents hydrogen.

In cases when the group R represents an N-acyl group, R preferably represents an α-aminoadipyl group, a benzyloxycarbonyl group, benzoyl group or substituted benzoyl group or a group of structure

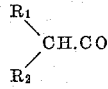

in which $R_1$, $R_2$ represent a hydrogen atom, an alkyl group, a phenyl group, a substituted phenyl group or a group of structure, $R_3$—O—, in which $R_3$ represents an alkyl group, a phenyl group or a substituted phenyl group, and are the same or different.

When any of $R_1$, $R_2$ and $R_3$ represent alkyl groups, the groups may be quite large and groups containing 1 to 10 carbon atoms, and more particularly 1 to 6 carbon atoms, are preferred. Where any of $R_1$, $R_2$ and $R_3$ represent substituted phenyl groups or R itself represents a substituted benzoyl group, nitro, chlorine, alkyl and alkoxy groups are preferred substituents. In the case of alkoxy groups, methoxy and ethoxy groups are especially suitable.

Compounds of particular importance falling within the general formula include the phenylacetyl, phenoxyacetyl, n-proprionyl, α-phenoxypropionyl, isobutyryl, hexanoyl, p-nitrophenylacetyl and p-nitrophenoxyacetyl and 2:6-dimethoxy benzoyl derivatives.

Further according to the invention there is provided a process for the preparation of the compounds of the invention as hereinbefore defined comprising hydrolysing the acetyl group from a compound of structure

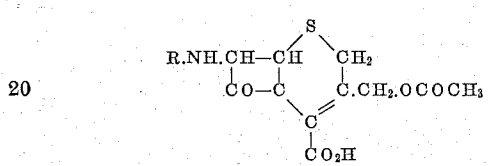

in which R represents a hydrogen atom or an N-acyl group or a soluble salt of such a compound, with a suitable enzyme.

Of the suitable enzymes which may be used, a very convenient enzyme has been found to be the citrus acetyl esterase (prepared as described by Jansen, Jang and MacDonell, Archiv. Biochem., 1947, 15, 415). It will be appreciated that the enzyme may be a group specific acetyl esterase, but that an enzyme which will remove any ester group (including an acetyl group) may also be used. The pH and temperature conditions at which the enzymic reaction should be carried out vary according to the enzyme used, but the pH should usually be in the range of about 5.5 to 8.0 and the temperature in the range of about 20° C. to 40° C. Where the citrus acetyl esterase has been used, best results have been obtained using a pH of between 6.0 and 7.0 and a temperature in the range of about 25° C. to 37° C.

The required desacetyl derivative can be separated from the reaction medium by separative methods known per se, for example chromatography and ion exchange.

Desacetylcephalosporin C is a particularly important compound of the invention. It is preferably prepared using the sodium salt of Cephalosporin C as a starting material, and can be separated from the reaction mixture after preparation by applying the mixture to a column of an anion exchange resin which is in the form of its salt with a weak acid and eluting the desacetylcephalosporin C with a solution containing the anion of a weak acid. Solutions of volatile buffers such as ammonium acetate or pyridine acetate at a pH of about 5 are convenient for this purpose. The desacetylcephalosporin C in the eluate may be detected by various methods dependent upon the eluant employed, for example by the ultra violet absorption spectrum of the product, its reaction with ninhydrin and its antibacterial activity. When the eluant is a solution of a volatile buffer, the product may be obtained as a solid by evaporation of the appropriate fractions of the eluate. A suitable salt of the product, such as the sodium salt, may then be obtained pure by crystallization.

Desacetylcephalosporin C can be characterised by the following properties:

(1) It shows no C-methyl in the Kuhn-Roth determination.

(2) The ultra violet absorption spectrum of its sodium salt at a concentration of 0.05 mg./ml. in aqueous solution shows $\lambda_{max}$ at 261 mμ (as illustrated in FIGURE 1).

Figure 2:
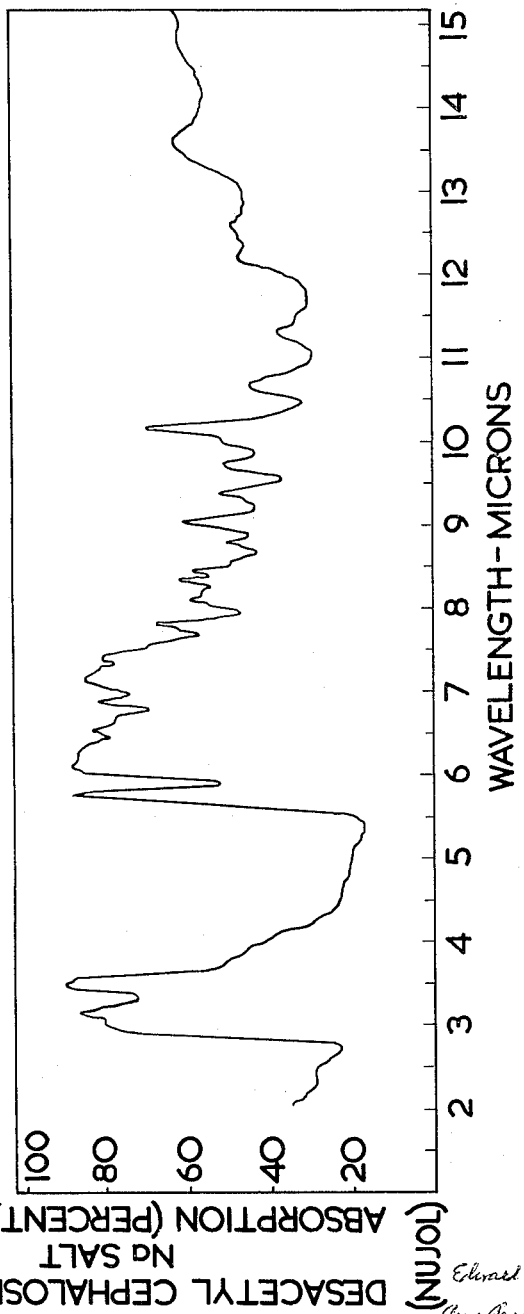

(3) The infra-red spectrum of its sodium salt (in Nujol) has the pattern illustrated in FIGURE 2.

(4) The activity of its sodium salt is about 2.3 units/mg. against *Staph. aureus* and 1.8 units/mg. against *Salmonella typhi* (compare Cephalosporin C sodium salt whose activity is 8–10 units/mg. against both organisms).

(5) When chromatographed on Whatman No. 1 paper (applied to the paper as the sodium salt and with descending solvent) it shows the following $R_{glycine}$ values:

| Solvent: | $R_{glycine}$ |
|---|---|
| (A) n-Butanol-acetic acid-water (4:1:4 by vol.) | 0.57 |
| (B) Propan-1-ol-water (7:3 by vol.) | 0.60 |

In solvent B it is resolved from Cephalosporin C (which shows $R_{gly}$ 0.77) and from Cephalosporin $C_c$ (which shows $R_{gly}$ 0.98).

(6) When subjected to electrophoresis on paper (14 v./cm. for 3.3 hours) in pyridine acetate buffer pH 4.5 it migrates 7.9 cm. towards the anode (Cephalosporin C migrates 7.5 cm. towards the anode, under these conditions, and Cephalosporin $C_c$ 1.9 cm. towards the cathode).

When the electrophoresis is carried out in 10% (v./v.) acetic acid it migrates 1.2 cm. towards the cathode (Cephalosporin C migrates 0.8 cm. towards the cathode, under these conditions, and Cephalosporin $C_c$ migrates 4.6 cm. towards the cathode).

(7) When dissolved in 0.1 N-hydrochloric acid or 1.0 N-hydrochloric acid it is rapidly converted to Cephalosporin $C_c$ (Cephalosporin $C_c$ is described in co-pending patent application No. 798,855), now U.S. Patent No. 3,049,541. This change can readily be demonstrated by subjecting a sample of the solution to electrophoresis on paper in 10% (v./v.) acetic acid. The newly formed Cephalosporin $C_c$ migrates 4.6 cm. towards the cathode and can be detected by its antibacterial activity.

(8) When allowed to react with certain acid chlorides, such as phenylacetyl chloride, it forms N-acyl derivatives with an increased activity against *Staph. aureus*. The acylation may be carried out on paper as described in co-pending patent application No. 191,213. These N-acyl derivatives have the structure

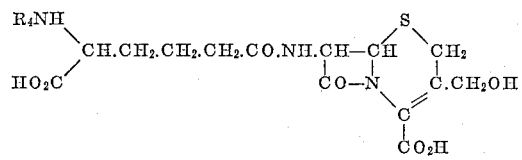

where $R_4$ represents an N-acyl group.

(9) When titrated electrometrically in water at 20° it shows groups with approximate pKa values of <2.5, 3.0 and 9.6. Back titration with alkali of a solution that has been kept at pH 1.9 for 2 hours indicates that about 28% of one acidic group has disappeared (due to lactonisation with the formation of Cephalosporin $C_c$). Back titration with acid of a solution that has been kept at pH 11.5 for 30 minutes indicates that partial hydrolysis has occurred with the formation of a new acidic group. This is presumably due to opening of the β-lactam ring.

Another important compound of the invention is the desacetyl derivative of 7-aminocephalosporanic acid, as it may be used as an intermediate for the preparation of acylated derivatives thereof. Thus, it will be seen that there are two alternative processes for the preparation of such acylated derivatives. Either the acylated derivative of 7-aminocephalosporanic acid can be treated with a suitable enzyme, or 7-aminocephalosporanic acid itself can be treated with the esterase and then acylated to produce the N-acyl derivative, e.g. by means of an acyl halide employing a method analogous to that described in application No. 191,213.

The compounds of the invention are useful as intermediates in the synthesis of antibiotically-active cephalosporins. Thus, the free alcohol group of the desacetyl compound may be reacted to produce other and more useful derivatives, e.g. by re-esterification with another acid. By variation of these substituents, compounds of varying activities can be prepared. Moreover desacetylcephalosporin C can be further acylated on the terminal amino group as mentioned above to produce new compounds some of which, for example the benzyloxycarbonyl derivative prepared by the action of carbobenzyloxy chloride, are useful intermediates in the synthesis of new O-acyl derivatives of desacetylcephalosporin C which may have antibiotic activity. The N-acyl derivatives of desacetylcephalosporin C may themselves have some antibiotic activity.

The following examples illustrate the invention:

EXAMPLE 1

Cephalosporin C sodium salt (52 mg.) was dissolved in a solution of citrus acetyl esterase (Jansen, Jang and MacDonnell, 1947). The solution was warmed to 30°, and the pH quickly adjusted to 6.5 by addition of 0.1 N sodium hydroxide. The temperature was maintained at 30°, and the pH was kept in the range 6.2–6.8 by addition of 0.1 N sodium hydroxide. The rate of addition of alkali necessary to maintain the pH decreased rapidly during the first fifteen minutes, and, after forty minutes, the pH remained constant without further addition of alkali, indicating completion of the reaction. The solution was cooled to room temperature and applied to a column (20 x 0.9 cm.) of Amberlite Xe–58 (120–200 mesh), acetate form, which had previously been brought to equilibrium with a solution of ammonium acetate, 0.2 M to ammonium, at pH 5.0. Elution was effected with the same concentration of ammonium acetate buffer, collecting one 3 ml. fraction every 35 minutes. Fractions were examined by measuring their absorption at 260 m$\mu$, and the main peak was found to lie between the 16th and 26th fractions. Fractions 17–24 were combined in a few ml. of water and freeze dried twice to remove as much ammonium acetate as possible. The residue contained the ammonium salt of desacetylcephalosporin C.

EXAMPLE 2

Cephalosporin C sodium salt (601 mg.) was dissolved in water (3 ml.) and added to a solution of citrus acetyl esterase (5 ml.) (Jansen et al., 1947) previously adjusted to pH 6.5. 0.25 N sodium hydroxide solution was added periodically to keep the pH between 6.2 and 6.9 and the solution maintained at 30° by a water jacket. After 95 minutes, the necessary rate of addition of alkali had become quite low, and a further 5 ml. of enzyme solution was added. After 200 minutes, the pH was practically constant without the addition of alkali. The solution was acidified to pH 5.0 with acetic acid, cooled to room temperature, and applied to a column (21 x 2.0 cm.) of Amberlite Xe–58 (120–200 mesh) acetate form. Elution was effected with a pyridine acetate solution 0.3 M to acetic acid, pH 5.0. Fractions of 4.5 ml. were collected every 14 minutes, and examined by spotting on to paper and colouring with ninhydrin. When this procedure revealed a peak, 0.1 ml. samples were taken, allowed to react with ninhydrin solution (Moore and Stein, 1948, J. Biol. Chem., 176, 367) and the colour density estimated. The main peak lay between fractions 45 and 77. Fractions 50–62 were combined and freeze-dried. The freeze-dried powder was dissolved in a minimum amount of water, precipitated with acetone (about 50 ml.) ground to a fine powder under acetone, and washed with a further quantity (about 50 ml.) of dry acetone. This powder was dissolved in water (3 ml.) and the pH adjusted to 7.9 by addition of 0.1 N sodium hydroxide. More water was added (10 ml.) and the solution freeze-dried. The freeze-dried product, desacetylcephalosporin C sodium salt, was crystallized from aqueous ethanol.

EXAMPLE 3

The outside skin from 80 oranges was removed and weighed—1334 g. This grated skin was mixed with acid washed sand (B.D.H.; 100 g.) and sodium chloride (20 g.) and pressed through cheesecloth. The resultant juice was saturated with sodium oxalate and filtered through a Whatman No. 42 filter paper under gravity. The extract (310 ml.) was mixed with an equal volume of saturated ammonium sulphate and the precipitate which formed recovered by centrifugation (2,000 r.p.m. for 15 minutes). This precipitate was resuspended in 0.1 M sodium oxalate (60 ml.) and dialysed at 5° overnight against 0.1 M sodium oxalate.

The sodium salt of Cephalosporin C (1.8 g.) was dissolved in water (9 ml.) and treated with citrus acetyl esterase (15 ml.) previously adjusted to pH 6.5. The mixture was stirred and the pH kept between 6.2 and 6.9 by the addition of 0.1 N sodium hydroxide. When the rate of addition had slowed, more citrus enzyme (15 ml. at pH 6.5) was added and the whole warmed to 30°. Reaction almost ceased after 33.7 ml. of 0.1 N sodium hydroxide had been added (theoretical=34.0 ml.). Bioautograph showed only one active spot corresponding to desacetylcephalosporin C. The main volume of reaction mixture was adjusted to pH 5.0 with 2 N acetic acid and applied to a 21 x 2.5 cm. column of Xe-58 resin buffered to pH 4.0. The column was then developed with 0.3 M acetic acid buffered to pH 5.0 with pyridine. 5 ml. fractions were collected from the column and 0.1 ml. samples were assayed for ninhydrin colour by the method of Moore and Stein (J. Biol. Chem., 176, 367, 1948). Peak activity occurred between fractions 66 and 101. These fractions were pooled and lyophilised. The solid was taken up in water (10 ml.) and precipitated with acetone (200 ml.). The oil was finally solidified by gentle evaporation under vacuum. The solid was recovered by centrifugation (1500 r.p.m. for 15 minutes) and ground with dry acetone (50 ml.). This solid was filtered, dissolved in water (10 ml. and taken to pH 7.9 with 0.1 N sodium hydroxide. The resultant solution of the sodium salt of desacetylcephalosporin C was lyophilised—yield 526 mg. Crystallization from aqueous ethanol afforded 342 mg. of a product which gave only one spot on bioautograph corresponding to desacetylcephalosporin C.

*Potency of desacetyl derivative of Cephalosporin C*

| Organism: | Percent of Cephalosporin C |
|---|---|
| B. subtilis, C289 | 58.0 |
| Staph. aureus, C864 | 23.0 |
| V. cholerae, C833 | 22.9 |

EXAMPLE 4

7-phenylacetamidocephalosporanic acid Na salt (52 μg.) was dissolved in water (0.2 ml.). Of this solution 0.1 ml. were withdrawn, 0.1 ml. of a solution of citrus acetyl esterase buffered with M phosphate to pH 7.4 added, and the solution incubated for 1 hour at 30°. 10 μl. samples of this solution and 5 μl. samples of the original solution were then applied to an electrophoresis sheet. A sample of Cephalosporin C was applied as marker, and the sheet allowed to dry at room temperature. The sheet was then sprayed with M pyridine acetate solution, pH 7.0, allowed almost to dry at room temperature, and hung in an atmosphere of pyridine (vapour in equilibrium with M pyridine acetate solution, pH 7.0) at 37° for 18 hours. The sheet was hung in a draught for 1 hour, markers of the original solution, the solution incubated with enzyme, and Cephalosporin C applied, and the sheet subjected to electrophoresis in 0.05 M pyridine acetate, pH 4.5, for 3 hours, at 14 volts per cm. The electrophoresogram was hung in a draught for one hour, and then examined by bioautograph on agar plates seeded with *Staph. aureus*. The results are summarised in the following table. Distances migrated towards the cathode are shown with a negative sign, distances migrated towards the anode with a positive sign.

| Specimen: | Distance migrated (cm.) |
|---|---|
| Ceph. G[1] | +6.6 |
| Ceph. G pyridine treated | −1.4 |
| Ceph. G enzyme treated | +7.4 |
| Ceph. G enzyme then pyridine treated | +7.1 |
| Ceph. C | +6.6 |
| Ceph. C pyridine treated | −1.3 |

[1] Ceph. G denotes 7-phenylacetamidocephalosporanic acid.

7-phenylacetamidocephalosporanic acid is thus converted by the action of citrus acetyl esterase into a substance that does not give a derivative of the Cephalosporin $C_A$ type on treatment with pyridine under the conditions used, confirming the formation of the desacetyl compound. The new substance migrates similary to 7-phenylacetamidocephalosporanic acid, and has high antistaphylococcal activity, but not as high as 7-phenylacetamidocephalosporanic acid itself.

EXAMPLE 5

7-aminocephalosporanic acid (1 mg.) was dissolved in 0.1 ml. of 0.1 M phosphate buffer pH 7.0. A sample (10 μl.) of this solution was mixed with 10 μl. of water and the resulting solution used as a control.

The remaining 90 μl. of the 7–ACA solution was mixed with 90 μl. of citrus acetyl esterase solution (adjusted to pH 7.0). This mixture and the control solution were kept at 30° C. for 1.5 hours. Samples (5 μl.) of both mixture and control were spotted on to Whatman No. 1 paper, and the paper sprayed lightly with M-pyridine acetate, pH 7.0, hung overnight in an atmosphere of the pyridine acetate, and finally dried in air. Further samples (5 μl.) of mixture and control were spotted on to paper and kept overnight in the laboratory air. Both the pyridine-treated and untreated spots were then subjected to electrophoresis on the papers (14 v./cm.) in buffer at pH 4.5 for 2.5 hours. The nucleus compounds were then phenylacetylated on the paper with phenylacetyl chloride as previously described. Spots of active phenylacetylated material were finally revealed by making bioautographs with *Staph. aureus* (Oxford strain) as the test organism.

The results were as follows:

(1) 7–ACA gave a large active spot which had migrated 3.4 cm. toward the anode.

(2) The product of the reaction of 7–AACA with acetyl esterase gave a somewhat smaller spot which had migrated 3.6 cm. towards the anode.

(3) The product of the reaction of 7–ACA with pyridine gave a large active spot, due to the Cephalosporin $C_A$ (pyridine) nucleus which had migrated 3 cm. towards the cathode.

(4) The product of the reactions of 7–ACA with (a) acetyl esterase and (b) pyridine showed only a trace of a product migrating towards the cathode.

Thus, 7-aminocephalosporanic acid is converted by the action of acetyl esterase to an active compound which migrates similarly to 7–ACA itself on electrophoresis at pH 4.5 but does not react with pyridine to yield an active derivate of the $C_A$ type. This indicates the production of desacetyl-7-aminocephalosporanic acid.

Desacetyl-7-aminocephalosporanic acid can be converted to N-acyl derivatives thereof by methods analogous to those described for the acylation of 7-aminocephalosporanic acid in co-pending application No. 191,213.

It will be appreciated that in operating the present invention the essential cephalosporin nuclear structure and stereo-configuration associated therewith which is necessary for antibiotic activity is to be maintained.

We claim:
1. A compound of the formula

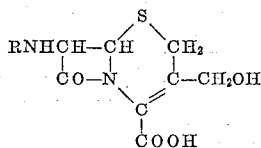

wherein R is selected from the group conissting of hydrogen, α-aminoadipyl, benzyloxycarbonyl, benzoyl, nitro-benzoyl, chlorobenzoyl, alkylbenzoyl, methoxybenzoyl, ethoxybenzoyl, and a radical of a carboxylic acid having the formula

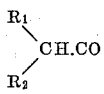

wherein $R_1$ and $R_2$ are each selected from the group consisting of hydrogen, alkyl of 1 to 10 carbon atoms, phenyl, nitro-phenyl, chlorophenyl, phenylalkyl, methoxyphenyl, ethoxyphenyl and $R_3$—O— wherein $R_3$ is selected from the group consisting of alkyl of 1 to 10 carbon atoms, phenyl, nitro-phenyl, chlorophenyl, phenylalkyl, methoxyphenyl and ethoxyphenyl.

2. A salt selected from the group consisting of the sodium, potassium and ammonium salts of the compounds of claim 1.

3. An acid addition salt of a compound of claim 1, in which R is hydrogen.

4. Desacetyl-7-aminocephalosporanic acid.

5. Desacetyl-7-aminocephalosporanic acid sodium salt.

6. Desacetyl - 7 - aminocephalosporanic acid hydrochloride.

7. Desacetylcephalosporin C.

8. Desacetyl-7-phenylacetamidocephalosporanic acid.

References Cited by the Examiner

UNITED STATES PATENTS

| | | | |
|---|---|---|---|
| 2,956,055 | 10/60 | Laubach | 260—243 |
| 3,001,913 | 9/61 | Beers | 195—29 |
| 3,003,921 | 10/61 | Kinoshita et al. | 195—29 |
| 3,010,961 | 11/61 | Schindler et al. | 260—243 |

OTHER REFERENCES

Biochemical Journ., vol. 81, pages 591–596 (1961).
Hackh's Chemical Dictionary, page 21 (1937).
Wertheim: Textbook of Organic Chemistry, pages 763–764 (1945).

NICHOLAS S. RIZZO, *Primary Examiner*.